(12) United States Patent
Florman et al.

(10) Patent No.: US 10,695,148 B2
(45) Date of Patent: Jun. 30, 2020

(54) MICRO VIBRATING DEVICES FOR DENTAL USE

(71) Applicant: Smile Lab, Inc, Los Angeles, CA (US)

(72) Inventors: Michael J. Florman, Pacific Palisades, CA (US); David Florman, Highland Heights, OH (US)

(73) Assignee: SMILE LAB, INC, Los Angeles, CA (US)

(*) Notice: Subject to any disclaimer, the term of this patent is extended or adjusted under 35 U.S.C. 154(b) by 0 days.

(21) Appl. No.: 15/352,490

(22) Filed: Nov. 15, 2016

(65) Prior Publication Data
US 2017/0224443 A1     Aug. 10, 2017

Related U.S. Application Data

(60) Provisional application No. 62/255,511, filed on Nov. 15, 2015, provisional application No. 62/292,071, filed on Feb. 5, 2016.

(51) Int. Cl.
| | | |
|---|---|---|
| *A61C 7/00* | (2006.01) | |
| *A61C 7/08* | (2006.01) | |
| *A61C 7/14* | (2006.01) | |
| *A61C 7/36* | (2006.01) | |

(52) U.S. Cl.
CPC ............... *A61C 7/008* (2013.01); *A61C 7/08* (2013.01); *A61C 7/14* (2013.01); *A61C 7/36* (2013.01)

(58) Field of Classification Search
CPC .. A61C 7/008; A61C 7/08; A61C 7/14; A61C 7/36
See application file for complete search history.

(56) References Cited

U.S. PATENT DOCUMENTS

| | | | |
|---|---|---|---|
| 4,348,178 A | | 9/1982 | Kurz |
| 4,499,906 A | * | 2/1985 | Wohlgemuth ....... A61B 5/1104 600/589 |
| 5,639,238 A | | 6/1997 | Fishburne, Jr. |
| 5,839,895 A | | 11/1998 | Fishburne, Jr. |
| 5,967,784 A | | 10/1999 | Powers |
| 7,044,736 B2 | | 5/2006 | Atkin et al. |
| 7,654,825 B2 | | 2/2010 | Ray |
| 7,854,698 B2 | | 12/2010 | Abolfathi |
| 8,123,520 B2 | | 2/2012 | Yamamoto et al. |
| 8,133,054 B2 | | 3/2012 | Yamamoto et al. |
| 8,152,521 B2 | | 4/2012 | Yamamoto et al. |
| 8,160,279 B2 | | 4/2012 | Abolfathi |
| 8,177,705 B2 | | 5/2012 | Abolfathi |
| 8,333,203 B2 | | 12/2012 | Spiridigliozzi et al. |
| 8,556,624 B2 | | 10/2013 | Yamamoto et al. |

(Continued)

OTHER PUBLICATIONS

FastTrack Instructions by Accelerated Orthodontics, www.fastrackortho.com, downloaded Jan. 2016.

(Continued)

*Primary Examiner* — Cris L. Rodriguez
*Assistant Examiner* — Hao D Mai
(74) *Attorney, Agent, or Firm* — Tope-McKay & Associates

(57) ABSTRACT

Described is a vibrating device for delivering energy to at least a portion of a dental appliance. The vibrating device may be inserted into a biting element or attached to a biting element to apply vibrations to the dental appliance to aid in aligning a user's teeth.

4 Claims, 19 Drawing Sheets

(56) References Cited

U.S. PATENT DOCUMENTS

| | | |
|---|---|---|
| 8,585,575 B2 | 11/2013 | Abolfathi |
| 8,636,506 B2 | 1/2014 | Pavlin |
| 8,708,701 B2 | 4/2014 | Levens et al. |
| 9,028,250 B2 | 5/2015 | Spaulding et al. |
| 9,101,438 B2 | 8/2015 | Montgomery |
| 9,143,873 B2 | 9/2015 | Abolfathi |
| 2003/0172939 A1 | 9/2003 | Hirchenbain et al. |
| 2004/0191720 A1 | 9/2004 | Coopersmith |
| 2006/0275739 A1 | 12/2006 | Ray |
| 2008/0209650 A1* | 9/2008 | Brewer ............. A46B 15/0002 15/22.1 |
| 2008/0227047 A1 | 9/2008 | Lowe et al. |
| 2009/0061375 A1 | 3/2009 | Yamamoto et al. |
| 2009/0061380 A1 | 3/2009 | Yamamoto et al. |
| 2010/0068670 A1 | 3/2010 | Yamamoto et al. |
| 2011/0076634 A1 | 3/2011 | Yamamoto et al. |
| 2011/0136070 A1 | 6/2011 | Rubin et al. |
| 2012/0040300 A1 | 2/2012 | Levens et al. |
| 2012/0148971 A1 | 6/2012 | Yamamoto et al. |
| 2012/0202166 A1 | 8/2012 | Kilcher et al. |
| 2012/0259158 A1 | 10/2012 | Abolfathi |
| 2013/0252193 A1 | 9/2013 | Bowman et al. |
| 2013/0273490 A1 | 10/2013 | Way et al. |
| 2014/0080082 A1 | 3/2014 | Lowe |
| 2014/0296618 A1 | 10/2014 | Abolfathi |
| 2014/0335467 A1 | 11/2014 | Yamamoto et al. |
| 2015/0044628 A1 | 2/2015 | Flyash |
| 2015/0064640 A1 | 3/2015 | Nobrega et al. |
| 2015/0111169 A1 | 4/2015 | Yamamoto et al. |
| 2015/0147711 A1 | 5/2015 | Lowe |
| 2015/0173857 A1 | 6/2015 | Lowe |
| 2015/0297319 A1* | 10/2015 | Chen ..................... A61C 7/008 433/18 |

OTHER PUBLICATIONS

Invisalign Aligner Chewies, screen shot downloaded Jan. 27, 2016.
International Search Report of the International Searching Authority for PCT/US2016/062089; dated Mar. 2, 2017.
The Written Opinion of the International Searching Authority for PCT/US2016/062089; dated Mar. 2, 2017.
Notification of Transmittal of International Search Report and the Written Opinion of the International Searching Authority for PCT/US2016/062089; dated Mar. 2, 2017.
Notice of International Preliminary Report on Patentability for PCT/US2016/062089; dated May 24, 2018.
International Preliminary Report on Patentability for PCT/US2016/062089; dated May 24, 2018.

* cited by examiner

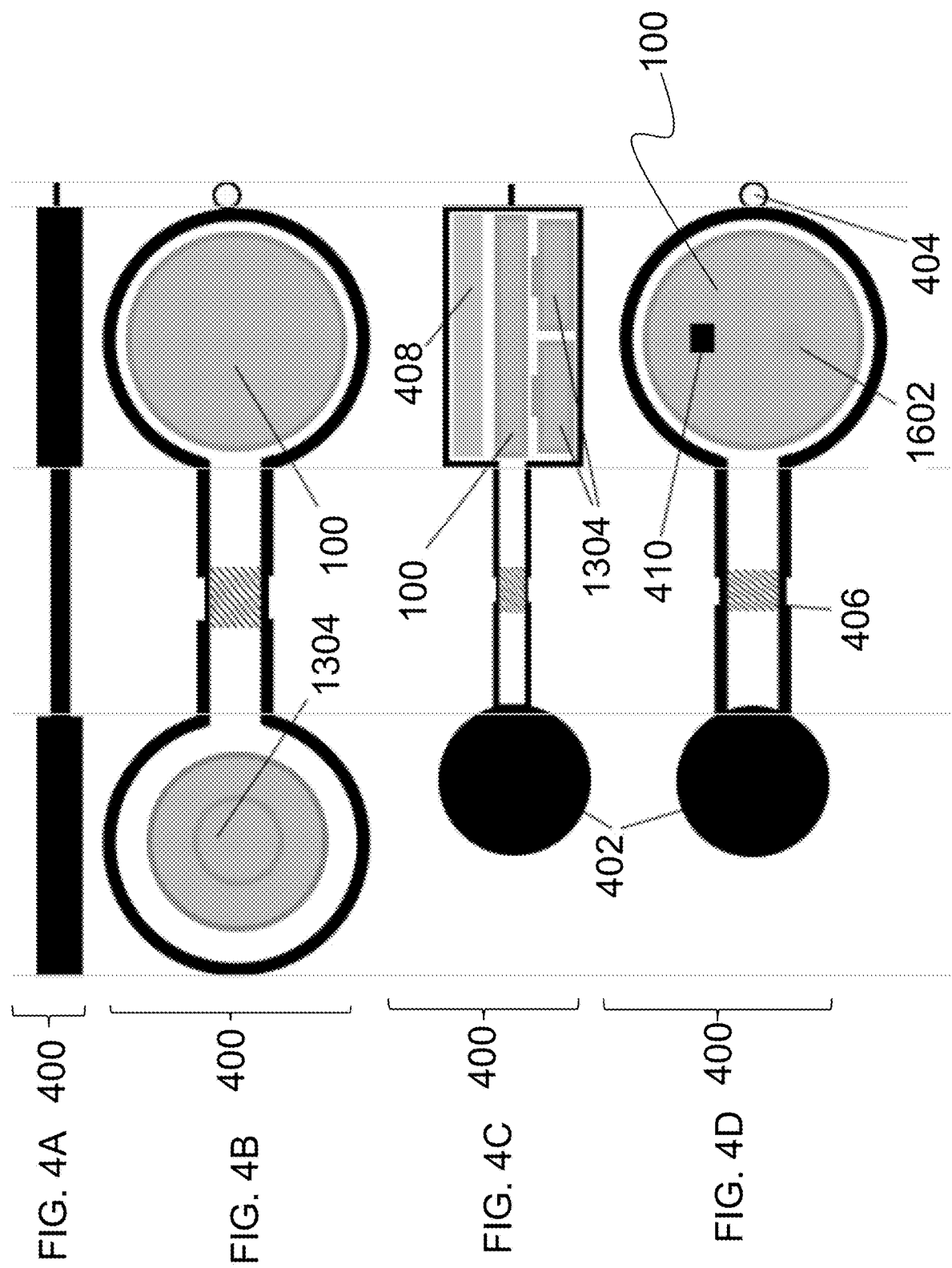

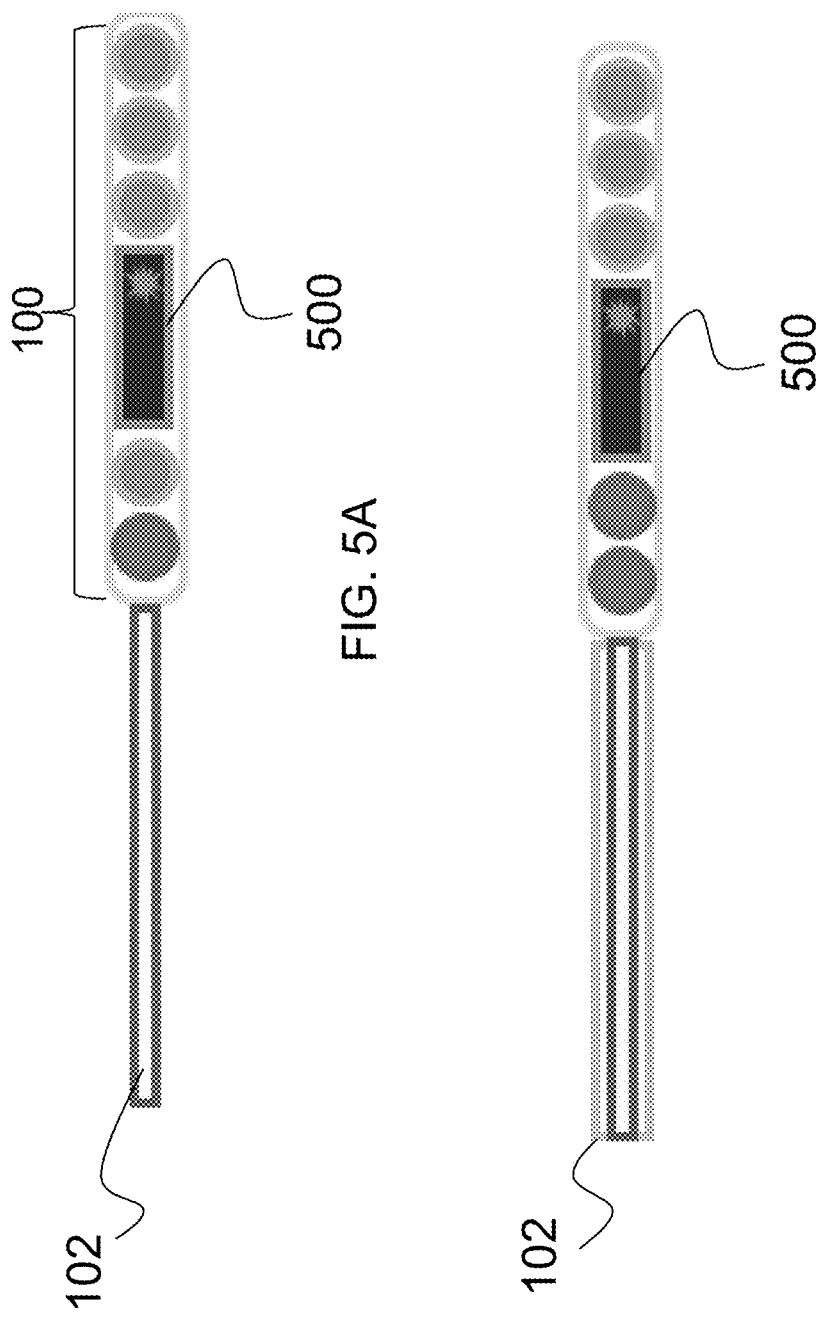

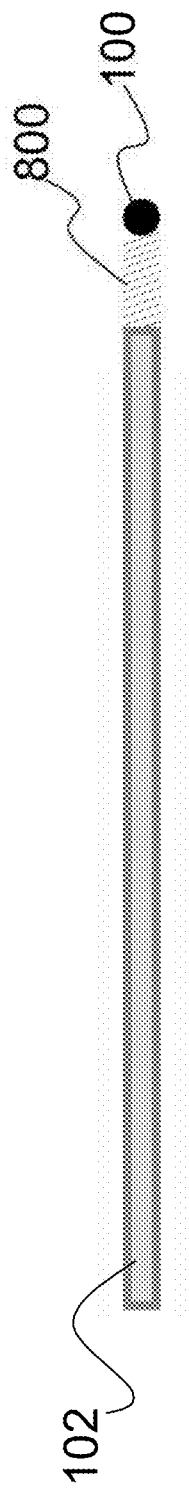

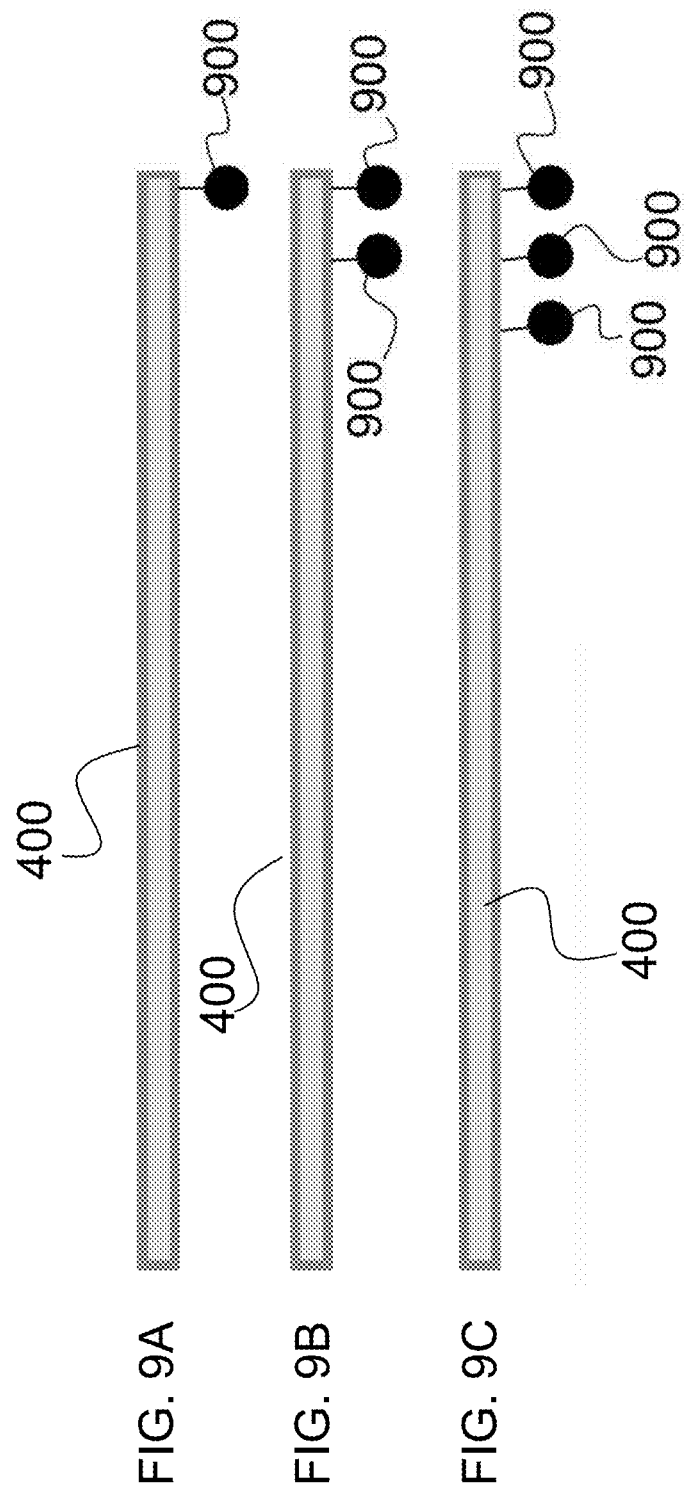

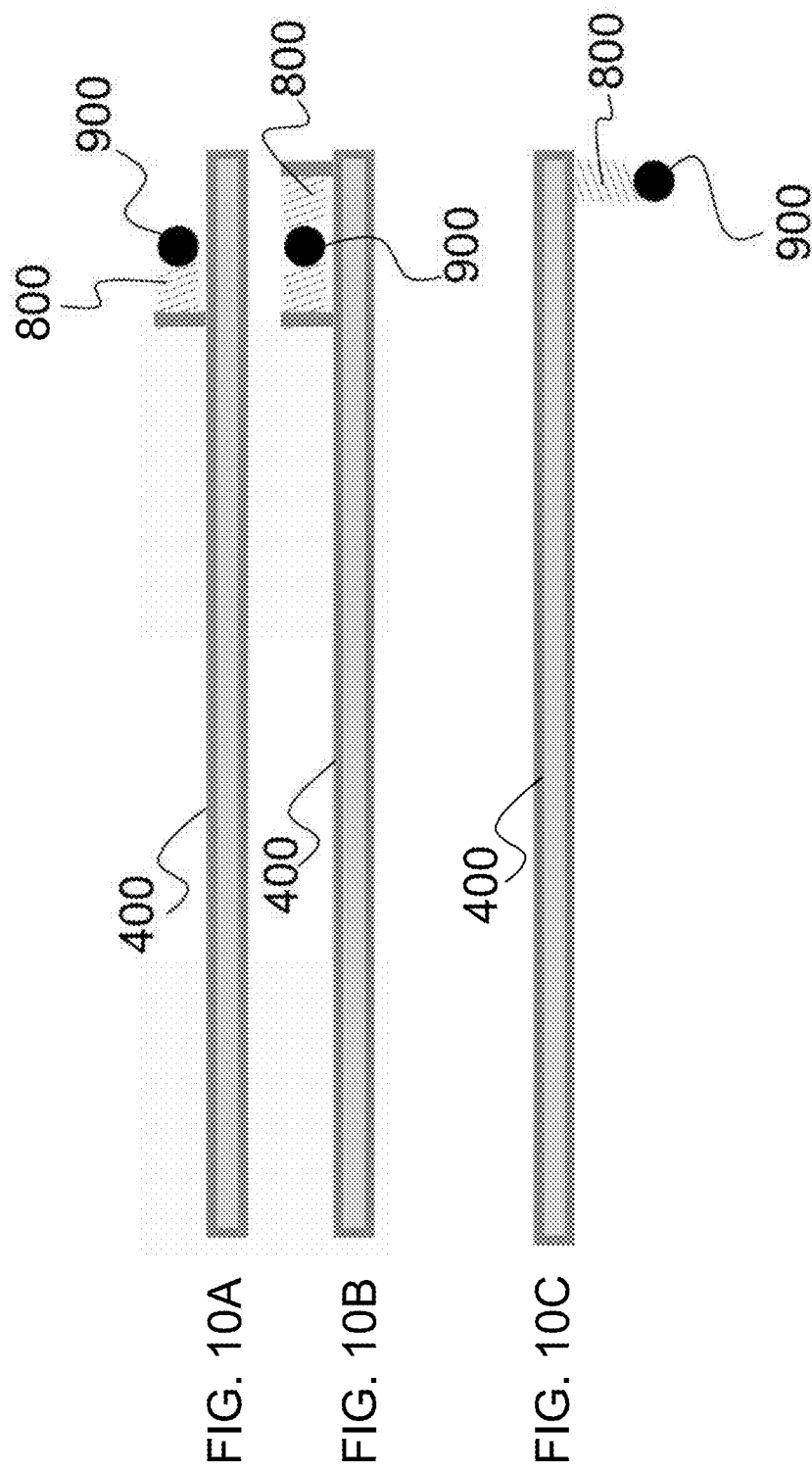

MICRO VIBRATING DEVICES FOR DENTAL USE

CROSS-REFERENCE TO RELATED APPLICATIONS

This is a Non-Provisional patent application of U.S. Provisional Patent Application No. 62/255,511, filed in the United States on Nov. 15, 2015, entitled, "Energized Orthodontic Chewie," the entirety of which is incorporated herein by reference.

This is also a Non-Provisional patent application of U.S. Provisional Patent Application No. 62/292,071, filed in the United States on Feb. 5, 2016, entitled, "Micro Vibrating Devices for Dental Use," the entirety of which is incorporated herein by reference.

BACKGROUND OF THE INVENTION

(1) Field of Invention

The present invention relates to a vibrating device for dental use and, more particularly, to a vibrating device for dental use having vibration parameters that can be controlled accurately.

(2) Description of Related Art

In order for orthodontic aligners to work properly, they must fit well over the teeth and maintain an accurate contact with the teeth while they are expressing their orthodontic tooth movement forces. Besides compliance, teeth move at varying speeds and, based on their positions, can offer challenges to removable appliances.

Aligner "chewies", which were introduced years ago, offered aligner wearers a soft rubber or silicone "chew" to bite into, aiding the aligner in fitting the teeth, and, ultimately, enhancing tooth movement. Problems with Aligner Chewies exist in that they only deliver a force to the trays and teeth when the user bites into them. Therefore, soon after patients begin using the chewies, their jaws tire quickly, and compliance becomes a challenge. Chewies, therefore, rely on jaw and facial muscles to contract and generate forces.

Vibration energy is composed of frequency and amplitude. In order to transfer this energy to another object, the device creating the vibration must be affixed to the object one wishes to vibrate. Several methods and devices have been described for transferring vibration energy from a source to the mouth. For instance, a bite plate can be placed into the patient's mouth in which the vibrator is affixed. The patient can bite down on the bite plate and hold the device in position for a desired time. Additionally, the vibrator can be placed onto the teeth by physically gluing the vibrator to a tooth or teeth. Further, orthodontic wires and braces can be configured to hold the vibrator on the teeth. In another example, a vibrating device can be held by an operator and pushed into a tooth or group of teeth.

Most of the existing prior art describes varying ranges of frequency and amplitude claiming that under certain parameters, exact amounts of energy can be delivered to the dentition. Claims range from enhancing tooth movement, to increasing aligner(s) fit, and to thickening of bone around surrounding teeth.

Thus, a continuing need exists for micro vibrating devices that deliver energy to dental appliances, aligners, teeth and jaws, which are configured to deliver exact amounts of energy to a dentition.

SUMMARY OF THE INVENTION

The present invention relates to a vibrating device for dental use and, more particularly, to a vibrating device for dental use having vibration parameters that can be controlled accurately. The vibrating device delivers energy to at least a portion of a dental appliance.

In another aspect, the vibrating device comprises a vibrating element attached with a bite element.

In another aspect, the vibrating device is attached with orthodontic brackets.

In another aspect, the vibrating element is powered by at least one spring element.

In another aspect, the vibrating device further comprises at least one mass element connected with the vibrating element.

In another aspect, at least a portion of the vibrating element is inserted within the bite element.

In another aspect, the vibrating element is controlled wirelessly.

In another aspect, the vibrating device is connected with a toothbrush.

In another aspect, the vibrating device further comprises a transparent housing comprising light emitting diodes.

In another aspect, the vibrating device is configured to deliver precise amounts of energy to the dental appliance.

In another aspect, the vibrating device is inserted into at least a portion of the dental appliance.

In another aspect, the vibrating device comprises a fluid filled cushion.

The present invention further comprises a method for aligning teeth. The method comprises acts of forming a vibrating device for delivering energy to at least a portion of a dental appliance positioned over a user's teeth; positioning the vibrating device in contact with the dental appliance; and inducing vibration of the vibrating device.

In another aspect, the vibrating device is formed to have a vibrating element attached with a bite element.

In another aspect, the method further comprises an act of attaching the vibrating device with orthodontic brackets of the user.

In another aspect, the method further comprises an act of delivering precise amounts of energy to the dental appliance.

In another aspect, the method further comprises an act of inserting at least a portion of the vibrating device into at least a portion of the dental appliance.

In another aspect, the method further comprises acts of attaching at least one spring element to the vibrating element; and delivering energy to the dental appliance through activation of the at least one spring element.

In another aspect, the method further comprises an act of attaching at least one mass element to a spring element to enhance the spring element's oscillation.

In another aspect, the method further comprises an act of forming the at least one mass element to be magnetized.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A illustrates the vibrating device having a depressed area between rectangular-shaped ends according to embodiments of the present disclosure;

FIG. 4B illustrates the vibrating device having a depressed area between round-shaped ends according to embodiments of the present disclosure;

FIG. 4C illustrates the vibrating device having a depressed area between a weighted ball first end and a rectangular-shaped second end according to embodiments of the present disclosure;

FIG. 4D illustrates the vibrating device having a depressed area between a weighted ball first end and a round-shaped second end according to embodiments of the present disclosure;

FIG. 5A illustrates a vibrating stick having a first width according to embodiments of the present disclosure;

FIG. 5B illustrates a vibrating stick having a second width according to embodiments of the present disclosure;

FIG. 8C illustrates a bite stick utilizing a single spring for vibrating the bite stick according to embodiments of the present disclosure;

FIG. 9A illustrates a bite stick with a single mass element attached according to embodiments of the present disclosure;

FIG. 9B illustrates a bite stick with two mass elements attached according to embodiments of the present disclosure;

FIG. 9C illustrates a bite stick with three mass elements attached according to embodiments of the present disclosure;

FIG. 10A illustrates a bite stick having a spring with a mass element attached to extend parallel to the bite stick according to embodiments of the present disclosure;

FIG. 10B illustrates a bite stick having two springs with a mass element in between the springs according to embodiments of the present disclosure;

FIG. 10C illustrates a bite stick having a spring with a mass element attached to extend perpendicular to the bite stick according to embodiments of the present disclosure;

DETAILED DESCRIPTION

Figure 1:
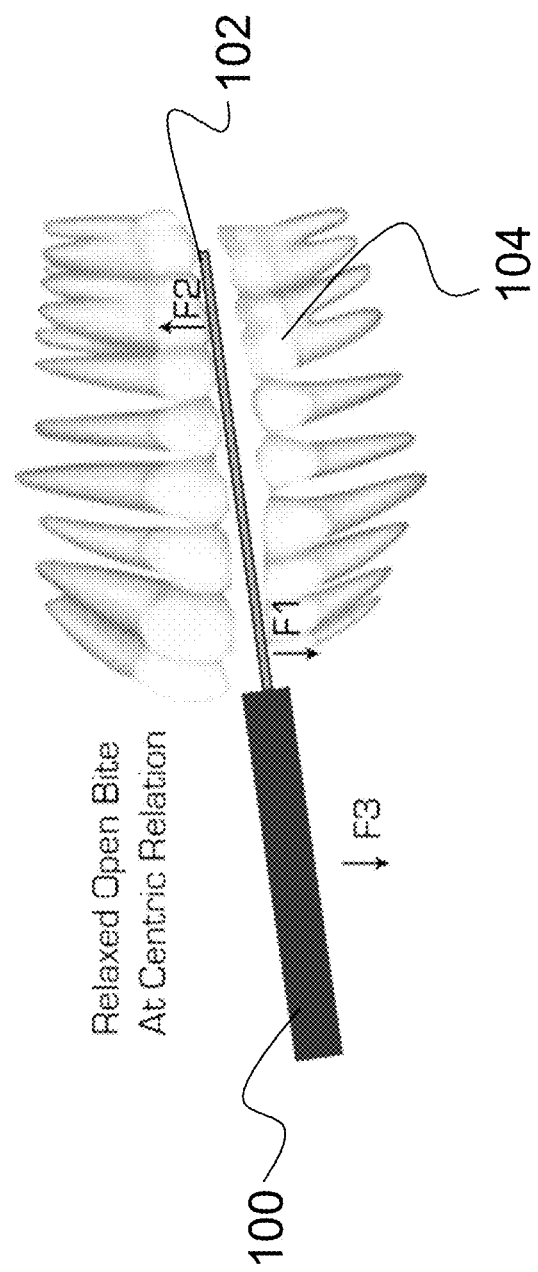
FIG. 1 illustrates a vibrator attached to a stick and inserted into the mouth of a patient according to embodiments of the present disclosure.

The present invention relates to a vibrating device for dental use and, more particularly, to a vibrating device for dental use having vibration parameters that can be controlled accurately. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Specific Details of the Invention (1.1) Energized Aligner Chewies

Described herein are energized (or powered) aligner chewies which deliver oscillatory energy to a dental appliance, such as a plastic aligner. The molecules in the plastic aligner move and stretch, allowing the aligner to grasp the teeth better as compared to an aligner alone, or a patient biting on an Aligner Chewie. The method described herein can deliver energy to dental appliances, aligners, teeth and jaws.

Figure 13:
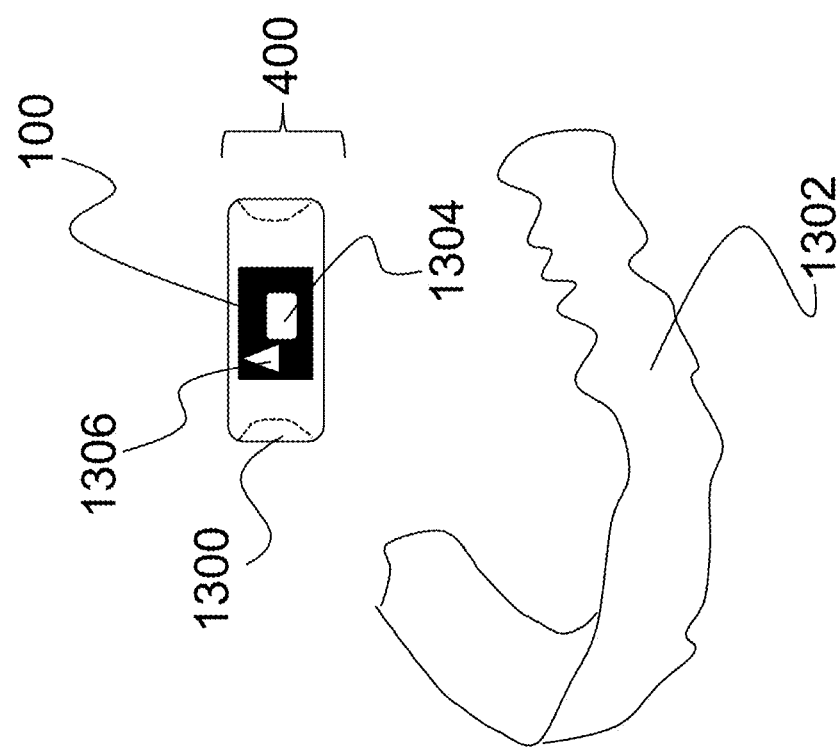
FIG. 13 illustrates an energized chewie and a dental appliance according to embodiments of the present disclosure.

Additional features of the powered aligner chewie according to embodiments of the present disclosure include the ability for a user to focus energy directly on parts of the aligner, approximating certain teeth being moved at the stage of the aligner series. For example aligner systems, such as Invisalign, produce a map showing the teeth undergoing difficult movements. With the invention described herein, users can follow the map and position the chewie directly over specific teeth. FIG. 13 depicts a vibrating device 400 in the form of a chewie 1300 (bite element) and vibrating element 100 within the chewie 1300. Also shown is a dental appliance 1302. In this example, the dental appliance 1302 is a plastic aligner.

There are many types of vibrators 100 to energize the powered aligner chewing, non-limiting examples of which include electromagnetic motors and piezo vibrators. Further, there are limitless frequencies and forces that can be used. In one embodiment, a battery 1304 powers the vibrating element 100.

The shapes of the chewies 1300 according to embodiments of the present disclosure can be cylindrical, sphere, oval, elliptical, crescent, quatrefoil, curvilinear, triangular prism, square, cube, cuboid, square pyramid, rectangular, trapezium, trapezoidal, pentagonal prism, pentagonal, hexagonal, heptagonal, kite, rhombus, octagonal, octahedron, nonagonal, nonahedron, decagonal, decahedron, tetrahedron, or tetrahedral. Additionally, the length of the chewie 1300 can range from 5 millimeter (mm) to 12 centimeters (cm).

The surface of the energized aligner chewie (vibrating device 400) that comes into contact with a patient's teeth or aligners can be smooth or textured. It may contain ridges, indentations, dimples, craters, groves, tracks, and/or serrations that allow the device to grip the smooth surface of the aligners.

The vibrating element 100 can fit within a center hole fabricated in the chewie 1300. The element can reside in its entirety within the chewie (as shown in FIG. 13), or protrude from the chewie in a distance ranging from 0.1 mm to 20 cm. The vibrating element 100 can be controlled with various controls ranging from a simple on-off switch to a bluetooth wireless controller that synchronizes with other electronic devices, such as a desktop or hand-held computer/phone.

In addition, positional data from the vibrating device 400 can be transmitted from a bluetooth sensor 1306 installed in the vibratory element 100 that transmits data between the vibrating device 400 and the electronic device. Programs can be written that instruct the user to move the vibrating device 400 to positions along the dental arch where focused energy needs to be delivered to specific teeth or groups of teeth. This data can be programmed into the electronic device communicating with the vibrating device 400 derived from the aligner system based on the number of the tray the user is wearing. For example, if on tray number 3 of 12, teeth numbers 9 and 2 need to be moved, the vibrating device 400 can send positional data to a smart phone through an app that helps the user find the correct position necessary to move these teeth. The computing device can inform the user to move the vibrating device 400 until it is properly located over the appropriate teeth, and then alert the user to keep the vibrating device 400 in that position for the desired amount of time. When the amount of time is achieved, the user can be instructed (via a visual alert on the screen or an auditory alert through the smartphone) to move the vibrating device 400 to a new position in the mouth for a new prescribed period of time.

As described above, the invention described herein offers patients undergoing aligner therapy an energized "chewie" that not only enhances the aligner's fit, but also accelerates the tooth movements by transmitting energy to the tooth's periodontal ligament, exciting the chain of chemical reactions involved in moving teeth. Invisalign, for example, provides orthodontists a map of teeth that will have more difficulty moving than other teeth.

Figure 15:
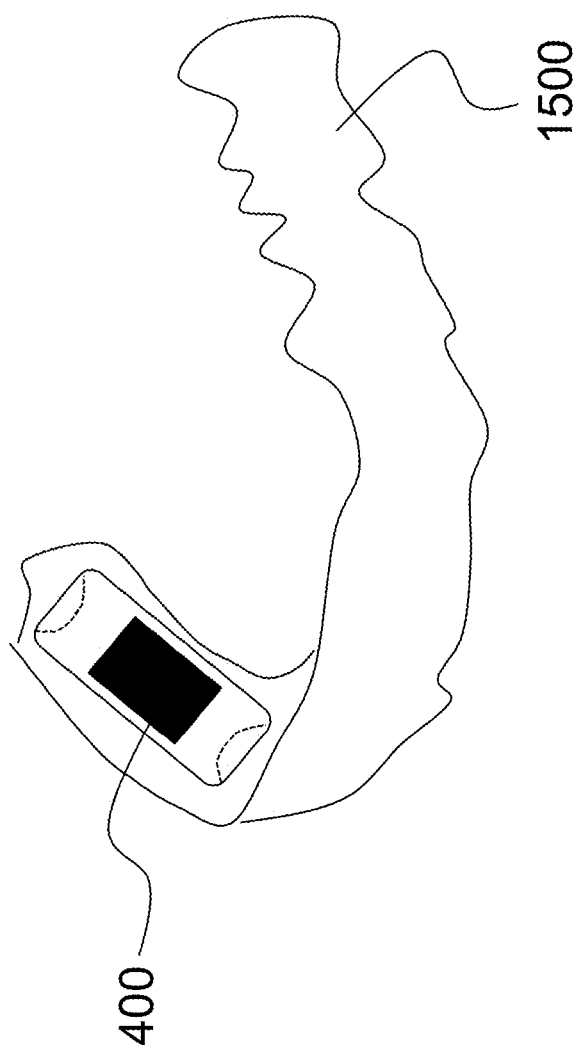
FIG. 15 illustrates an energized chewie inserted into a dental appliance according to embodiments of the present disclosure.

In one embodiment shown in FIG. 15, a small version (i.e., micro chewie) of the vibrating device 400 can affix to a female member molded into the aligner 1500 on any surface (lingual, occlusal or buccal), which is placed on or over the areas of the teeth that need vibration. Manufactures of aligners 1500 can create sleeves or attachment points directly on the aligner tray to allow a micro chewie to be affixed. When the treatment session is completed, the vibrating device 400 can be removed from the aligner 1500, and the patient can resume wearing the aligner 1500 without the vibrating device 400 affixed.

The powered aligner chewie (vibrating device 400) can either be disposable or reusable. In a reusable embodiment of the invention, the battery 1304 and the head/tip can be changed. The device can have a timing sequence programmed with a device that chimes when the user needs to switch the vibrating device 400 to either the opposite side, or front segment of the dental arch.

The powered aligner chewie can have a frequency range of 0.1 Hertz (Hz)-1000 Hz., acceleration peak of 0.01 to 4, and a magnitude strain of 0.1 to 300 microstrain. The vibration can be constant during the period of time the device is delivering its energy, or be pulsed at varying intervals from 0.1 second (s) delays to up to 5 second delays.

Further, the shape of the chewie 1300 and housing that contains the vibrator 100 can be straight, curved, one arm, two arms, two arms fixed, or two arms hinged.

The chewie 1300 slides over the housing containing the vibratory member/element 100. The chewie 1300 has two diameters, an inner diameter and an outer diameter. The inner diameter and outer diameters can be any shape described above and can be the same or different than the outer diameter. The inner diameter can range from 2 mm to 10 mm wide. The outer diameter can range from 3 mm to 40 mm. The thickness of the chewie 1300 measured by the distance between the inner wall and outer wall of the chewie 1300 can range between 1 mm and 20 mm.

The powered chewie (vibrating device 400) can be composed of many different materials. Non-limiting examples of materials include Aflas (AG Fluoropolymers), Butyl (IIR), Chlorosulfonated Polyethylene (CSM)—Hypalon®, Epichlorohydrin (ECO), Ethylene Propylene (EPDM), Fluoroelastomer (FKM)—Viton®, Fluorosilicone (FQ), Hydrogenated Nitrile (HNBR), Natural Rubber (NR), Nitrile (NBR), Perfluoroelastomer (FFKM), Polyacrylic (ACM), Polychloroprene (CR)—Neoprene®, Polyurethane (PU), Silicone, Styrene, Butadeine (SBR), PTFE, Silicone or polyurethane. The housing can be fabricated from medical grade polymers, such as, but not limited to, Polymethyl methacrylate (PMMA), Polycarbonate, Polyamide, Liquid crystal polymers (LCP), Polyphenylene Sulfide (PPS), Polybutylene terephthalate (PBT), Acetal copolymer (POM), Cyclic olefin copolymer (COC), Polyethylene, Polypropylene, Polystyrene, Acylonitrile butadiene, styrene (ABS), Styrenic block copolymer (SBS), Thermoplastic polyurethane (TPU), Polyether block amide (PEBA) polyurethane.

In another embodiment, the vibratory member 100 may connect to a metal member that fits into the housing and attaches to the chewie 1300 rather than a plastic polymer. The metal may be stainless steel, titanium, or other metals or alloys that are compatible in the mouth.

Figure 14:
FIG. 14 illustrates an energized chewie attached with a toothbrush according to embodiments of the present disclosure.

Another embodiment of the invention shown in FIG. 14 is a vibrating device 400 that attaches to a housing that is then adapted to fit on existing sonic or rotary toothbrushes 1400. One example includes cutting of the brush head from an existing power or sonic toothbrush 1400 and grinding the rough end to fit an existing rubber or silicone chewie 1300. Yet another embodiment of the invention includes fabricating a custom vibrating device 400 to fit an existing brush head of a toothbrush 1400 after the head is cut off.

Another embodiment comprises a vibrating device 400 that has all of the electronics inside the chewie 1300, with nothing sticking out past the rubber or silicone. A switch that activates the vibrating device 400 can be located either on the housing outside the rubber or silicone chewie or within the rubber or silicone boundary. The switch can be a toggle type switch, an on/off switch, or a switch that just depresses and speaks to the controller.

The controller can contain a small auditory device, such as a speaker or piezo device, that alerts the user to sounds programmed into the device. Alerts can indicate to the user battery life, notification to switch location of the device inside the mouth, notifications to begin or stop using the device, etc.

The chewie rubber or silicone hardness can range between: Shore OO—zero through one-hundred; Shore A—zero through one-hundred; Shore D—zero through one-hundred. The chewie can be made from polymers that have memory, similar to memory foam pillows, that adapt to the users occlusal surfaces when the chewies contacts the teeth. As the patient moves the chewie across the dental arch, and occludes (bites), the material immediately conforms to the surfaces then returns to the original shape. The device can contain a rechargeable battery or replaceable battery.

Another embodiment describes three chewie pads connected by members that connect to a main housing. The device has two arms that articulate allowing the end user to move the two distal pads to desired positions in the mouth. The chewie can be either injected molded allowing the shape to have one entrance hole for the housing to slide into, or can be extruded and then cut, therefore having a hole on both ends. The housing shape that engages the rubber or silicone chewie can be smooth, textured, threaded or constructed with barbs.

Powered chewies that are small can contain a ring on the end allowing the user to either attach it to a key ring, or attach a string, rope, or chain to prevent aspiration by the user.

Figure 16:
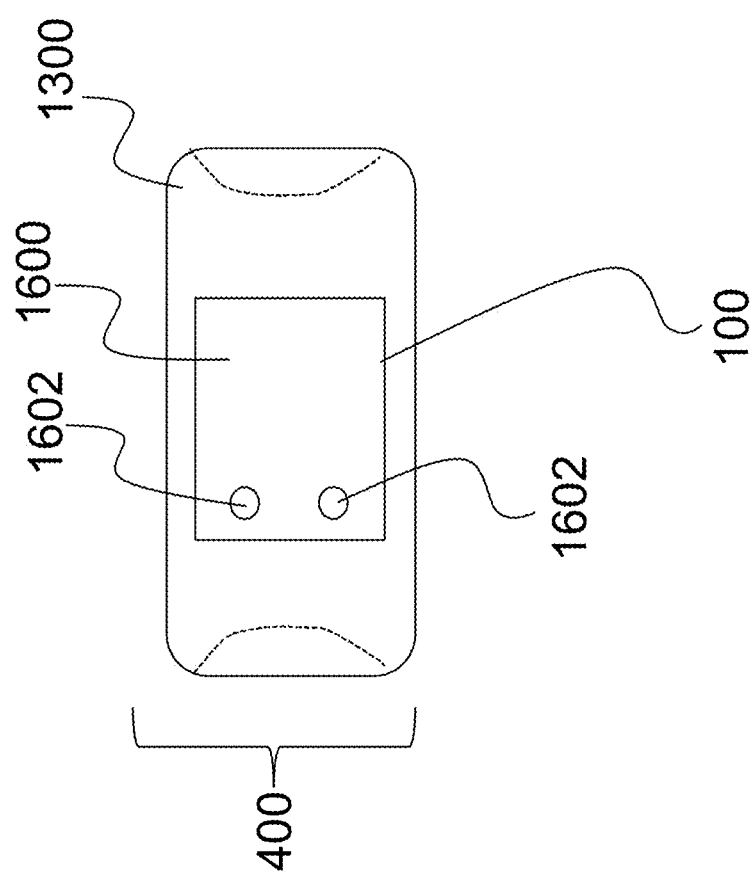
FIG. 16 illustrates an energized chewie having a transparent housing a light emitting diodes.

Another embodiment of the invention depicted in FIG. 16 can incorporate a clear housing 1600 that contains light emitting diodes 1602 that can transmit different spectrums of light in the ultraviolet (UV), visible, and infrared (IR) ranges, capable of increasing blood flow to the oral tissues. The light emitting diodes (LEDs) 1602 can be positioned between rings of chewie materials or the chewie materials can be made from clear polymers allowing the light to transmit.

(1.2) Vibrating Devices with Non-Chewie Bite Element

Described below is a method and device to deliver exact amounts of energy to a dentition. The amounts of energy being delivered can be calculated and repeatable every time the patient uses the device. Additionally, the present invention eliminates the inherent error that exists with all other previous devices and methods. The following design and associated mathematics will be evidence that existing issued patents actually do not deliver what they claim.

(1.2.1) Non-Bite Stick/Plate

Prior art describes vibrators attached to plates that patients bite down on. The problem with these methods is that it is well understood that bite forces vary from patient to patient and are also not stable over any period of time more than a few seconds (due to fatigue of the muscles of mastication and temporomandibular region). By using only gravity to affix the vibrating device, all associated variables are removed from the system according to embodiments of the present invention.

In FIG. 1, a vibrating element 100 (or vibrator) is attached to a stick 102 or a horseshoe shaped member and inserted into the mouth 104 while the patient is in a relaxed, open position. This position can be centric relation or the natural position of the mandible while open at rest. In most people at rest, the mandible rests with a distance between the upper and lower teeth described by a well-documented measurement called centric relation. Forces (i.e., F1, F2, and F3) being delivered can be calculated exactly by using the formulas of lever arms. In the example depicted in FIG. 2, gravity multiplied by the mass of the vibrator acts as a downward force. Depending on how the patient's lower jaw is positioned in relation to the upper jaw, forces being delivered will be different.

Figure 2:
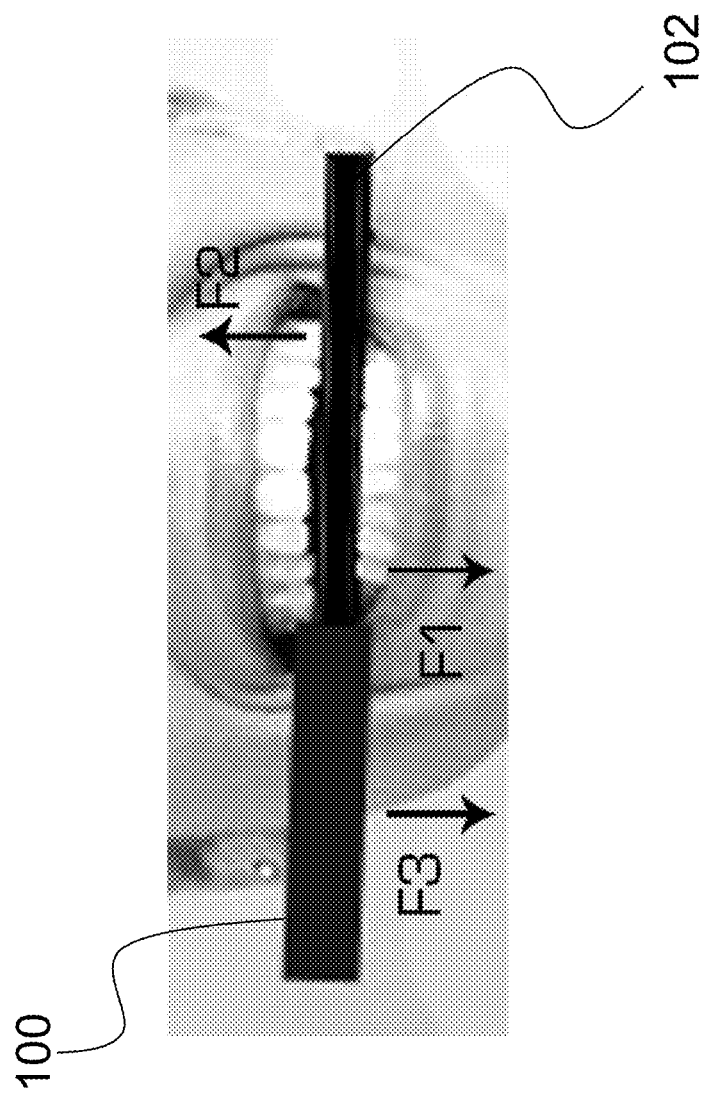
FIG. 2 illustrates a patient clenching on the vibrating device to deliver forces according to embodiments of the present disclosure.

If the patient is clenching on the vibrator's mouthpiece (e.g., stick 102), the forces will be delivered to a centroid point of the mouthpiece. If the patient is resting the mandible in the centric relation position, two different forces to the upper jaw and the lower jaw. As shown in FIG. 2, the forces (i.e., F1, F2, and F3) delivered to both jaws is now controllable and adjustable based on altering the following variables: (1) the mass of the vibrator 100 and the mass of the plate or stick 102; and (2) the distance between (a) the fulcrum (noted by the F1 force vector (the lower jaw)) and the centroid position of the vibrator (noted by the F3 force vector position) and (b) the fulcrum (noted by the F1 force vector (the lower jaw)) and the centroid position of the tooth contact on in the maxillary arch. By alternating the position of the plate or stick 102, one can deliver forces to all quadrants of both dental arches while knowing the exact forces being delivered.

By altering the mass of the vibrator 100 or decreasing the mass, one will alter the total sum of the forces being delivered to the dental arches. Either the vibrator can be manufactured at a specific weight, or allow the user to add or remove weights depending on the desired amount of force to be delivered. No prior art describes the actual delivered forces to the mouth because they do not take into account the mass of the vibrator and the bite stick/plate, and or the amount of force the patient is delivering during biting.

Another embodiment of the invention describes the dentist/orthodontist taking measurements of the patient's biting forces while the patient is biting in a comfortable position, and using these forces in combination with the mass of the unit and the actual vibrator motor force and frequency to calculate the needed forces to achieve the desired delivered force. If one were to bite too hard or too soft, it would change the amount of vibration needed to effectively produce the effective vibrational force required. For example, if one were to bite down with 1 Newton of force vs. 2 Newtons of force, the amount of vibration force delivered to the same surfaces will be different based on the amount of force the patient is biting on.

Other variables that comes into play are the materials used to transfer the energy to the biting surfaces from the vibration unit. Some materials transfer energy better than others. If one were to use a soft silicone versus a hard plastic placed between the teeth and the vibrating unit, the amount of force delivered to the teeth would be different.

Figure 3:
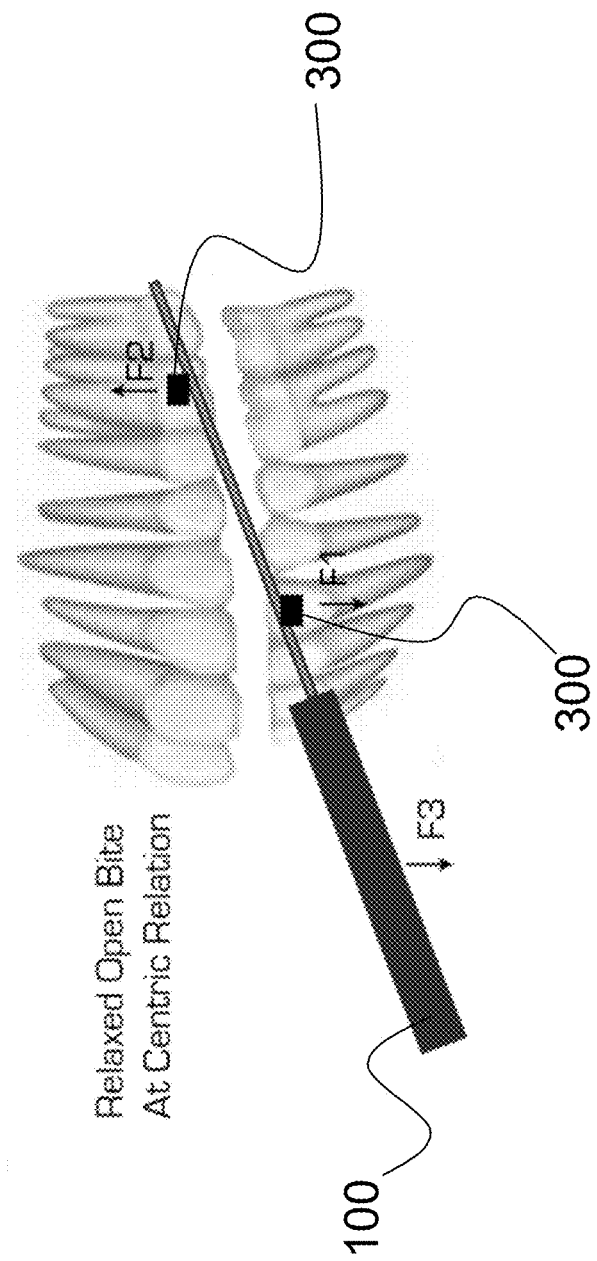
FIG. 3 illustrates attaching the vibrator to orthodontic brackets according to embodiments of the present disclosure.

FIG. 3 illustrates a method that attaches the vibrator 100 to either bracket type members 300 affixed to the certain teeth, or modified orthodontic brackets that work with standard brackets where they are all tied together by the braces arch wire. Another embodiment describes attachments that protrude from orthodontic aligners that the vibrator 100 can be propped against. By eliminating the necessity of biting, there are no uncontrolled forces entered into the equation, such as biting forces or forces imposed by the surrounding tissues while the patient is biting.

The member that interfaces with the teeth on the vibrator 100 can range in shapes from rectangular, straight, curved, fork shaped, horseshoe shaped, or curved. The member can be wedge-shaped or any other shape that when inserted between the arches (under no biting pressure) affected by gravity, deliver the vibration energy. The member can be fabricated from one or more different materials. Non-limiting examples of materials include hard plastics, metals and alloys, covered or not covered with softer plastics, rubbers or silicones.

The member can be rigid or flexible, or have memory properties that allow the member to bend to conform to occlusal surfaces. Non-limiting examples of materials include nickel titanium wire that has shape memory, plastics, and foams that bend and return to their original shape. Other materials, such as coated braided wires, can be used that allow the user to bite into the object and temporarily deform the shape to better fit the teeth. Boil and bite type plastics, such as ethyl vinyl acetate, can also be used.

In another embodiment of the invention, an ultra-low mass vibrator system is described that allows the delivery of minimal forces. Due to the fact that the total mass of the vibrating device (i.e., vibrator and portion that touches the teeth, braces, or aligner) exerts forces to the jaws in addition to the forces generated by the vibrating component's (e.g., micro motor vibrator), the lower the mass, the lower the total energy delivered to the oral structures and appliances. This embodiment describes devices that total a mass range between 0.1 grams to 30 grams.

In additional embodiments of the invention, depicted in FIGS. 4A-4D, the vibrator 100 balances on a point 406 at the center of gravity of the vibrating device 400 (i.e., vibrator 100 and portion that touches the teeth, braces, or aligner). At that point 406, when the mandible and maxilla engage the vibrating device 400 there may be serrations or a depressed line, area, or notch that allows the user to quickly place the device between the dental arches. The shape of the member touching the teeth can be rectangular having two distinct lengths or heights allowing users to easily rotate the device to find an accommodating position so the device is sandwiched between the maxilla and mandible without the need for any biting forces. Another embodiment uses a weighted ball 402 on the tongue side that balances the vibrating device 400 and also allows the user to manipulate the vibrator 100 side. Due to the small size of the vibrator 100, one may wish to attach a loop 404 to a hook on a keychain or lanyard. This will prevent the vibrator 100 from being aspirated or swallowed. The vibrator is controlled by a controller 408 that can be activated by, for example, an on/off switch 410.

Another embodiment, shown in FIGS. 5A and 5B, describes a small vibrating "stick" 102 that the patient can easily move side-to-side using his/her tongue, lips, and facial muscles. The diagram in FIG. 5 demonstrates a shape that resembles a digital thermometer. The protruding "stick" 102 that enters the patient's mouth can either be sandwiched between the maxillary and mandibular teeth or placed in between the mandibular and maxillary arch when the mandible is at centric relation position. The stick 102 can be round, rectangular, triangular, or any other suitable shape. The length can vary from 1 inch to 12 inches. The width of the stick 102 can range in size from $\frac{1}{16}$ of an inch to 1 inch. The length of the vibrator unit can range from $\frac{1}{8}$ of an inch to 10 inches depending on the size of the electronics and battery 500.

Figure 6A:
FIG. 6A illustrates a vibrator having a first length attached to a vibrating stick according to embodiments of the present disclosure.
Figure 6B:
FIG. 6B illustrates a vibrator having a second length attached to a vibrating stick according to embodiments of the present disclosure.

As illustrated in FIGS. 6A and 6B, the sticks 102 can range in sizes to accommodate an individual patient's centric relation opening. A kit can be sold that has multiple different sized sticks 102 that patients fit themselves. The sticks 102 can be inserted and removed from the vibrator 100 and be fabricated from metal, plastics, rubber or any combination of these materials. They can be rigid or flexible or both. They can be coated with softer or harder materials and/or can be fabricated from two or more different materials assembled or fused together.

Orthodontic aligners may have a standardized "slot" fabricated or attached to a side of the aligner on the buccal or lingual sides, allowing a small vibrator 100 to be affixed. The attachment slot or channel does not interfere with aligner wear and allows the vibrator 100 to be placed and removed. The attachment slot can also be a snap, clip, hook, or any other well-known method of attaching one object to another.

Figure 7A:
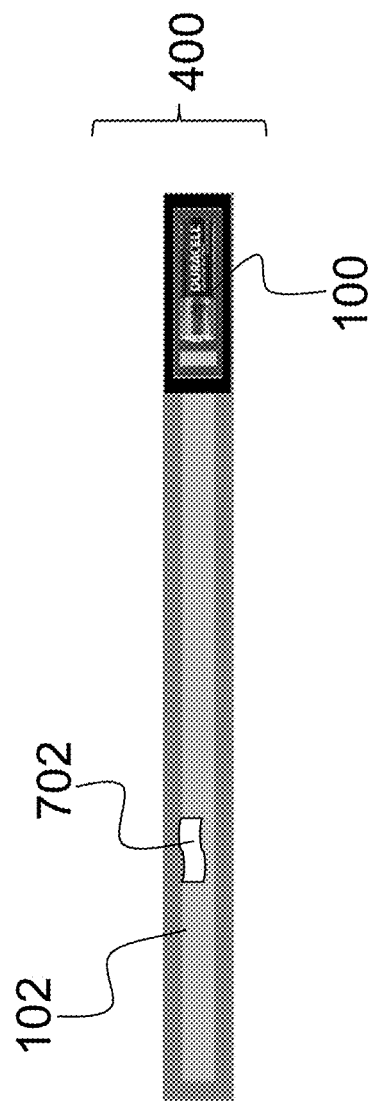
FIG. 7A illustrates a vibrator attached to a bite stick according to embodiments of the present disclosure.
Figure 7B:
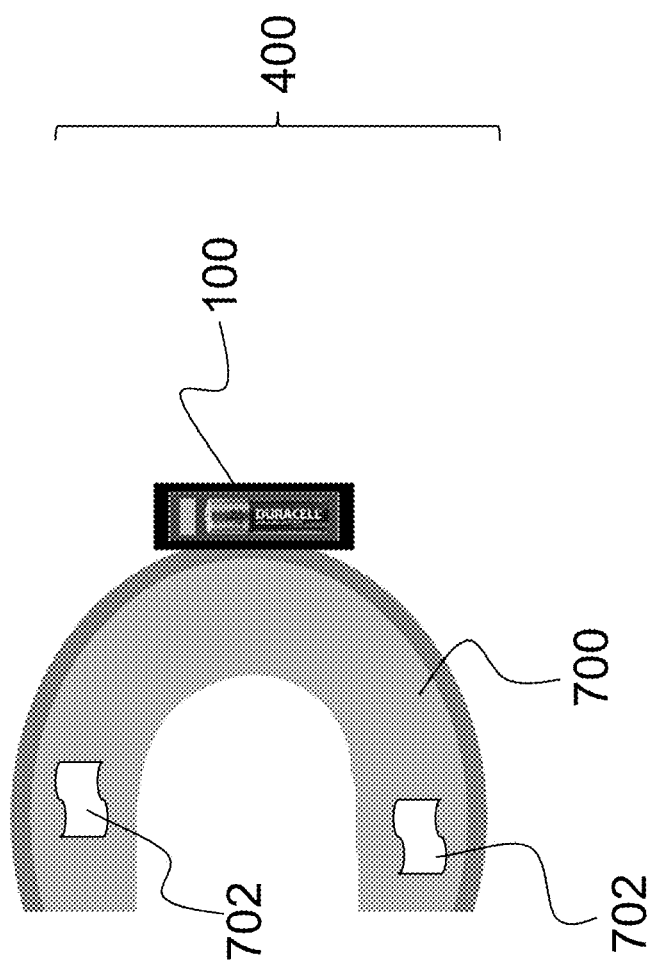
FIG. 7B illustrates a vibrator attached to a bite plate according to embodiments of the present disclosure.
Figure 8B:
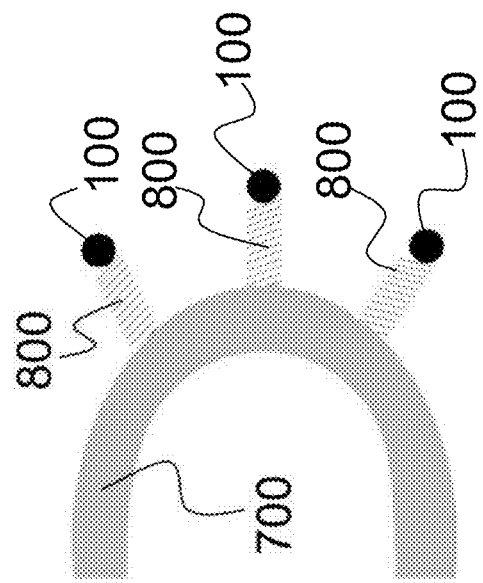
FIG. 8B illustrates a mouth plate utilizing multiple springs for vibrating the mouth plate according to embodiments of the present disclosure.
Figure 8A:
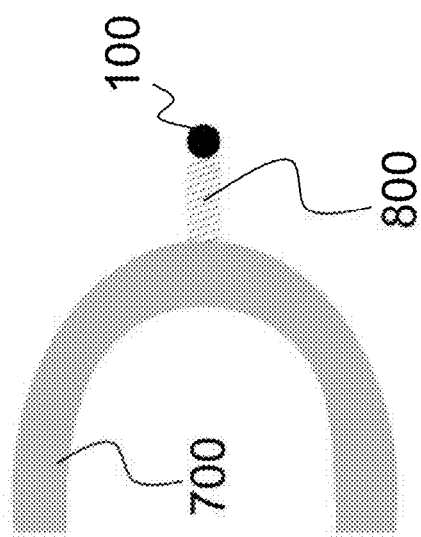
FIG. 8A illustrates a mouth plate utilizing a single spring for vibrating the mouth plate according to embodiments of the present disclosure.
Figure 8D:
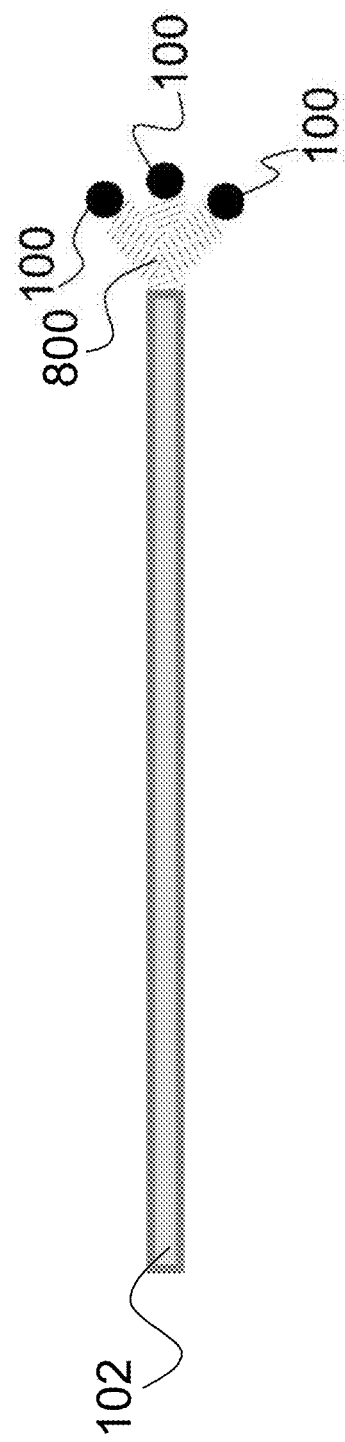
FIG. 8D illustrates a bite stick utilizing multiple springs for vibrating the bite stick according to embodiments of the present disclosure.

A vibrator 100 can be attached to a bite stick 102 or bite plate 700 designed in a variety of shapes and sizes, as depicted in FIGS. 7A and 7B, including, but not limited to, horseshoe shapes, straight rectangular, semi-horseshoe shape, oval shape, and semi-circle, laminated on one or both sides containing a fluid such as water, alcohol, or other agents that can transmit the vibration energy. This design allows users to achieve multiple benefits over a vibrator attached to a standard bite plate. At least one fluid-filled cushion 702 contained in the present invention adapts to the patient's teeth when the patient is in either centric relation or when biting into centric occlusion. The fluid-filled cushions 702 (or pads) are designed to be removable from the vibrating device and replaced as the pliable plastic surrounding the fluid wears. Fluids in the pads can be similar to fluids used during ultrasound procedures that aid in the transmissions of vibrational energy. Some ingredients may contain: water, vegetable glycerin, glyceryl acrylate/acrylic acid copolymer, propylene glycol, PVM/MA copolymer, carbomer, diazolidinyl urea, methylparaben, propylparaben, aloe veraextract, and sodium hydroxymethylglycinate. Fluids to aid in the transmission of energy between teeth and aligners or retainers can be used. By placing a transmission fluid between the teeth and the tooth moving aligners, energy transmission will be enhanced as compared to systems that do not use a transmission fluid.

In embodiments of the present invention, and shown in FIGS. 8A-8D, a mouth plate 700 or bite stick 102 utilizes a vibrator 100 that is powered by springs 800 that can come in many shapes and sizes. Energy is placed into the system by having the user/patient use their fingers to activate the spring. Another unique way the user can add energy into the system to vibrate the mouthpiece is to have the user bite up and down in chewing manner. The forces of chewing will transfer from the mouth to the mouth or bite plate, which transfers the energy to the spring. Nodding of the patient's head will also transfer energy to the spring. As the spring oscillates it returns the vibration energy to the mouthpiece.

As depicted in FIGS. 8A-11, the spring 800 can have a mass 900 attached to it or not. When a mass 900 is added on the end of the spring 800, the mass 900 enhances the spring's 800 oscillation. Frequency can be altered by lengthening and shortening the spring 800. Amplitude can be adjusted by changing the mass hanging at the end of the spring 800.

A mass 900, or multiple masses 300, can be added to the mouthpiece end of the vibrating device 400, and when activated in a similar manner to the spring 800 above, will transfer a vibration energy to the mouth. The masses 900 can be magnetized creating different pulsations and other unique energy transfers.

Other mass/spring configurations can be used, such as using a watch mechanism that allows the user to transfer energy from the wind-up spring(s). The oscillations' frequency and amplitude can be set and adjusted. A wind-up timer, similar to an egg timer mechanism, can be placed on the end of the mouthpiece or biteplate/stick, and not only allow the user to set a timer, but deliver pulsating energy to the mouthpiece as the timer countdown. A hairspring can simply be added to the end of the member that enters the mouth attached to a mass that can oscillate and transfer energy to the mouth.

The member that enters the mouth can be fabricated from many materials that range from metals and plastics, that are stiff and do not bent, to materials that flex and have memory. Metals, such as nickel titanium, can bend when deformed and rebound. In one example, a wound spring that can be made from a variety of metals can be used that, when bit on, flexes and vibrates. The flexible spring can also have varying winding spacing with or without a mass at the end to create an oscillation.

Figure 11:
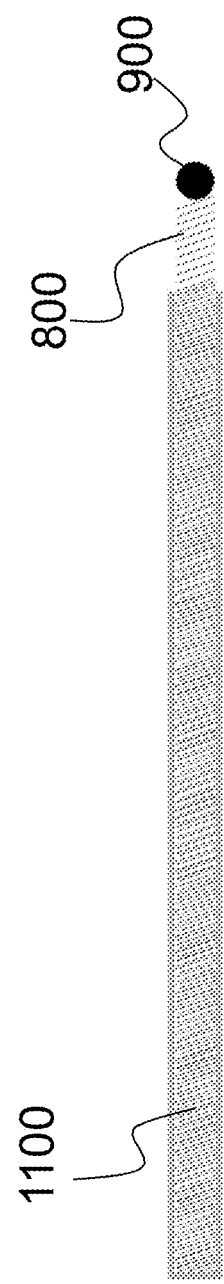
FIG. 11 illustrates a bite stick covered with a coating that adds cushion to the portion of the bite stick that enters the patient's mouth according to embodiments of the present disclosure.

As shown in FIG. 11, the bite stick 102/plate can be covered or coated with numerous coatings 1100 or polymers that add cushion to the member that enters the mouth when the patient bites down on the member or allows the member to rest on the patients teeth at centric occlusion. Coatings 1100 can include, but are not limited to, plastics, rubbers, silicones, ethylvinyl acetate, or any of the soft plastics or rubbers used on common toothbrushes.

Figure 12:
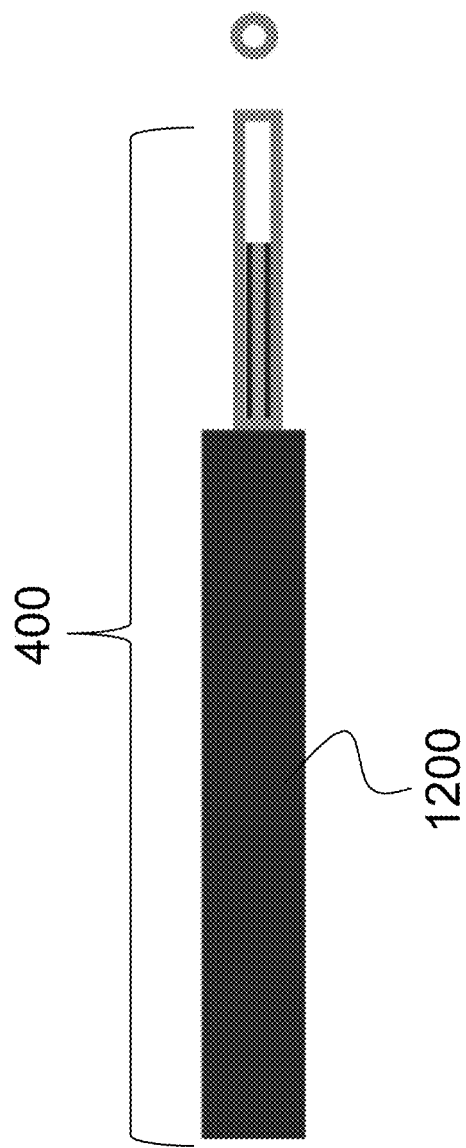
FIG. 12 illustrates a vibrating device having a hard member that extends from the vibrating device according to embodiments of the present disclosure.

As depicted in FIG. 12, the vibrating device 400 can have a hard member that extends out (i.e., an extension 1200) from the mechanical device that is covered by a tip that can either be fixed or removable and replaceable. The tip can come in many shapes and sizes and can either be fit to cover the hard extension 1200 partially, cover the hard extension 1200 in its entirety, or extend the hard surface and hang over.

The extension 1200 can protrude past the hard member a distance ranging between 0.1 millimeters (mm) to 150 mm to allow the user a soft, cushioned surface to place between the teeth or bite into.

It will be readily apparent to persons skilled in the relevant arts that various modifications and improvements may be made to the foregoing embodiments, in addition to those already described, without departing from the basic inventive concepts of the present invention.

What is claimed is:

1. A method for forming and using a device for aligning teeth in a user, comprising acts of:
    forming an elongated stick having a first end and a second end;
    positioning a vibrator element at one of the first end and the second end, wherein the vibrator element is configured for delivering vibrational forces to one or more of the user's teeth;
    forming and sizing the device to be repositionable at various positions within the user's mouth;
    forming the device such that at least a portion of the elongated stick contacts the one or more of the user's teeth;
    delivering controllable and adjustable vibrational forces to the user's one or more teeth by positioning of the device in the user's mouth at the various positions;
    connecting a removable weighted mass element having a weight with one of the first end and the second end, such that the vibrational forces delivered to the user's one or more teeth are further controllable and adjustable based on the weight of the removable weighted mass element; and
    adjusting the vibrational forces delivered to the user's one or more teeth by connecting or removing the removable weighted mass element.

2. The method as set forth in claim 1, further comprising an act of attaching the device with a dental appliance.

3. A method for forming and using a device for aligning teeth in a user, comprising acts of:
    forming an elongated stick having a first end and a second end, wherein at least a portion of the elongated stick is formed to contact one or more of the user's teeth;
    attaching a spring with one of the first end and the second end;
    attaching a removable weighted mass element to the spring to enhance the spring's oscillation; and
    oscillating the spring to deliver vibrational forces to the one or more of the user's teeth due to a weight of the weighted mass element, wherein in oscillating the spring, the user does one or more of the following: oscillating the spring manually, nodding of the user's head, and biting up and down on the device.

4. The method as set forth in claim 3, further comprising an act of forming the removable weighted mass element to be magnetized.

* * * * *